J. C. FRENCH.
MULTIPEDAL TRACTOR.
APPLICATION FILED SEPT. 24, 1917.
1,388,637.
Patented Aug. 23, 1921.
2 SHEETS—SHEET 2.
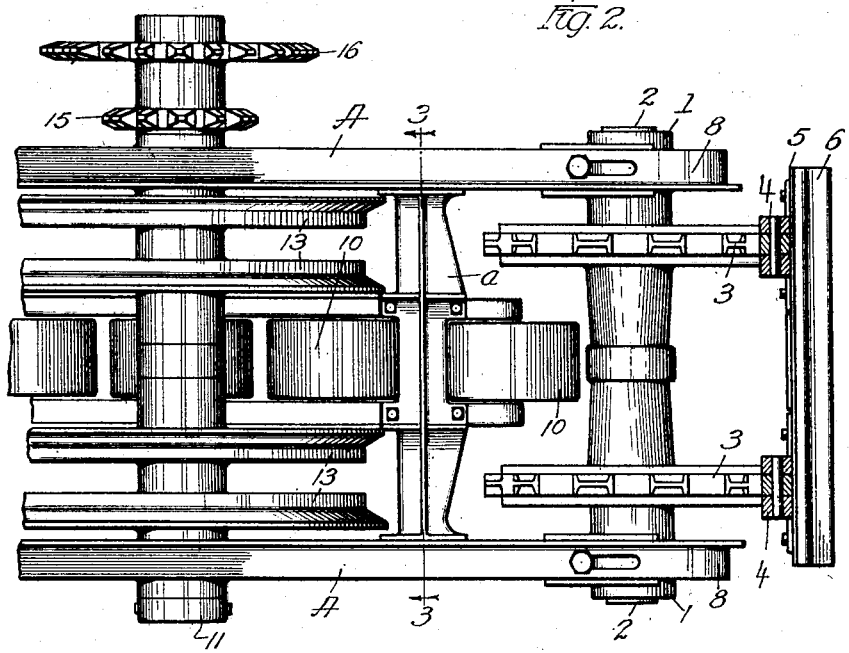
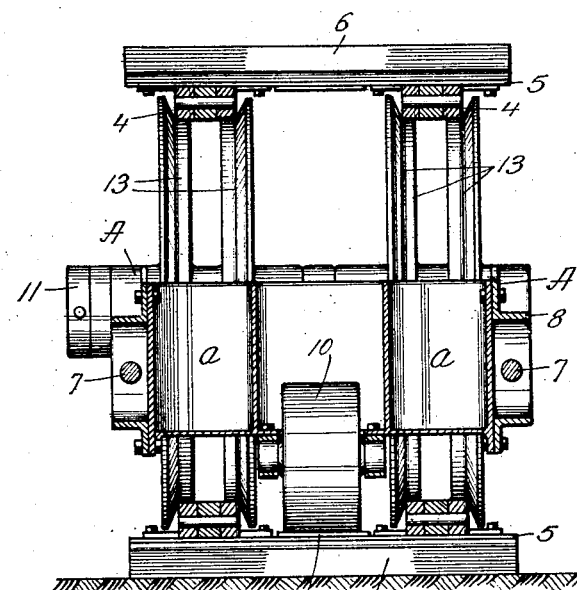

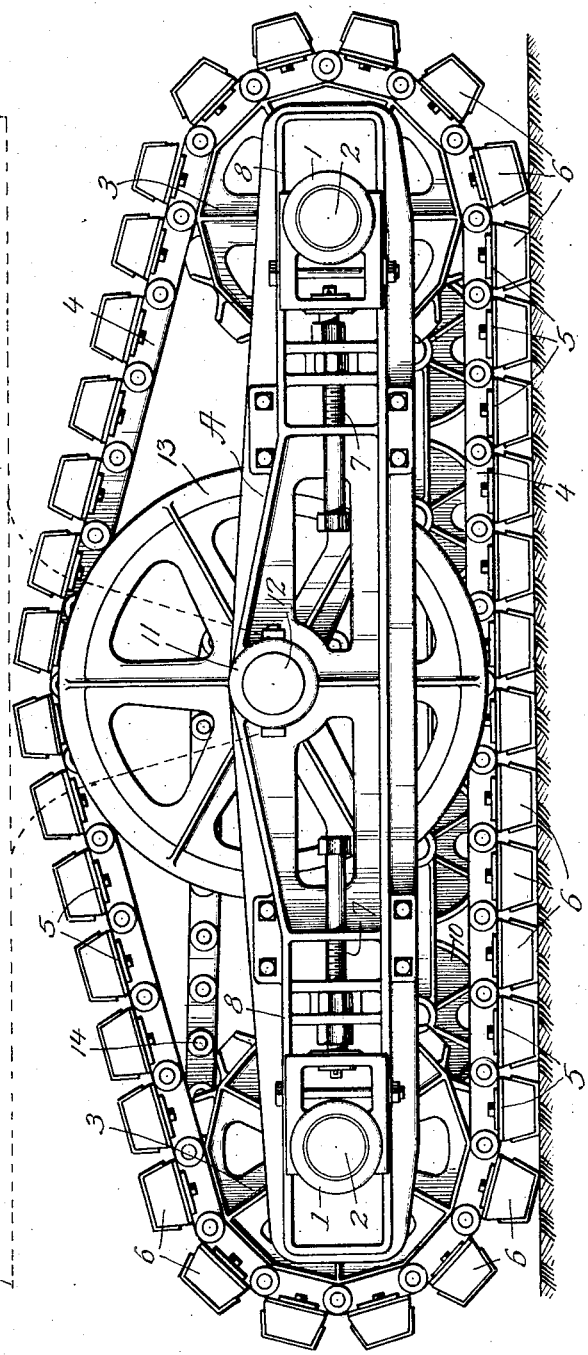

UNITED STATES PATENT OFFICE.

JAMES C. FRENCH, OF CHICAGO, ILLINOIS, ASSIGNOR TO FREDERICK C. AUSTIN, OF CHICAGO, ILLINOIS.

MULTIPEDAL TRACTOR.

1,388,637.      Specification of Letters Patent.      Patented Aug. 23, 1921.

Application filed September 24, 1917. Serial No. 192,896.

*To all whom it may concern:*

Be it known that I, JAMES C. FRENCH, a citizen of the United States of America, and resident of Chicago, Cook county, Illinois, have invented a certain new and useful Improvement in Multipedal Tractors, of which the following is a specification.

My invention relates to tractors of that kind in which the traction means comprises a series of connected treads forming an endless belt arranged to travel on the ground. In a traction device of this character, a frame provided with sprocket wheels is arranged within the endless belt, said wheels engaging the belt, and rollers being employed to support the weight of the frame on the lower portion of the belt. Also, in a traction device of this kind, the frame that carries the endless belt is ordinarily arranged to tilt about a transverse axis, so that the tractor may tilt while passing over uneven surfaces, thereby to keep the flat lower surface of the belt firmly on the ground, and to prevent breakage or straining of the parts. With this construction, under certain conditions, the wheels of the frame sometimes show a tendency to ride off from the belt, which is the case when the machine, such as an excavator, lurches or swerves to one side.

Generally stated, therefore, the object of my invention is to provide a novel and improved construction which will prevent lateral displacement of the lower portion of the belt relative to the rollers or wheels that travel thereon, so that, in a traction device of this kind, there will be less danger of breakage or straining of the belt and other parts than heretofore.

It is also an object to provide certain details and features of construction, and combinations, tending to increase the general efficiency and desirability of a traction device of this particular construction.

In the accompanying drawings:

Figure 1 is a side elevation of a tractor embodying the principles of my invention, a portion of the body of the excavator or other machine being shown in dotted lines.

Fig. 2 is a plan of the construction shown in Fig. 1 with one end portion thereof broken away, and with the endless belt shown in section, for convenience of illustration.

Fig. 3 is a transverse vertical section on line 3—3 in Fig. 2.

As thus illustrated, my invention comprises a pair of side frames A connected together and spaced apart a fixed distance by transverse beams or members a, so that a rigid and horizontally disposed frame is provided. Bearings 1 are provided at the front and rear ends of this frame, for the transverse shafts 2, and sprocket wheels 3 are mounted on said shafts and spaced a suitable distance apart. The endless sprocket chains 4 are mounted on said sprocket wheels and are connected together by transverse plates 5 to which the treads 6 are secured. These treads can be of any suitable material which will render them suitable for contact with the ground. Adjusting screws 7 are provided for adjusting the bearings 1 on the longitudinal guides 8, so that the distance between the shafts 2 can be increased to tighten the belt. The plates 5 are provided midway between their opposite ends with short plates 9, so that a flat track or path is provided on the inner surface of the belt midway between the side edges thereof. Rollers 10 are suitably mounted in bearings on the frame and arranged to bear upon the plates 9, so that through these rollers the entire weight of the frame, and of the excavator or other machine, is sustained by the lower portion of the belt which rests on the ground.

About midway between the front and rear ends of the frame members 1, bearings 11 are provided for the transverse shaft 12 upon which are mounted the flanged wheels 13, the tread portions of these wheels rolling on the tops of the links of the chains 4, and the flanges of these wheels embracing said chains. The sprocket wheels 3 at one end of the tractor are operated by power transmitted thereto through the sprocket chain 14 and which latter is operated by the sprocket wheel 15 on the shaft 12. The larger sprocket wheel 16 is mounted on the shaft 12 and may be connected by a sprocket belt with the source of power.

In use, the frame or body of the excavator is provided with bearings mounted on the shaft 12, so that the entire traction device is arranged to tilt about a transverse axis in passing over uneven surfaces of the ground. Also, the wheels 13 may be of greater diameter than the sprocket wheels 3, so that the upper portion of the belt will be held in a raised position at the middle thereof, and whereby the top of the belt will slope downward toward the opposite ends of the frame on which the belt is carried, as shown in Fig. 1 of the drawings. With this construction, the traction device can be arranged directly under the frame or body of the excavator or other machine, and can tilt upward at either end until the top of the belt at either side of the axis of tilting motion is parallel with the underside of said frame or body.

In use, the flanges of the wheels 13 will prevent lateral displacement of the belt, relative to the tilting frame on which it is carried, and which is supported by the belt, so that lurching or swerving of the structure to either side will not result in straining or breakage of the belt. The rollers 10 sustain the weight of the structure on the treads 6 of the belt, and travel along a path between the two link belts or chains 4, and the latter may carry very little of the weight, or practically none at all, depending upon the relative arrangement of the parts. In any event, though, the wheels 13 engage the chains 4 and coöperate with the sprocket wheels 3 to prevent lateral displacement of the belt, and to prevent the wheels 10 from veering or slipping off from the path of travel provided therefor by the plates 9 between the two chains. Thus the axis or tilting motion of the traction device is provided with means for holding the belt against lateral displacement, as well as with means for driving the belt.

The wheels 13 are preferably as large as possible, so that the flanges thereof will extend a substantial distance along the sides of the two chain belts, thus insuring against displacement of the belts.

It will be seen that the rollers 10 rest directly on the treads of the broad belt, these treads in their entirety being commonly referred to as slats, and with this arrangement the load weight is supported by the unconnected portions of the treads or slats—that is to say, the rollers 10 impose the load weight directly on the treads, instead of on the sprocket chains 4, which latter are engaged by the wheels 13 merely to prevent lateral displacement of the belt. If the rollers 10 were arranged to engage or rest upon the said sprocket chains, then the load weight would be communicated indirectly to the treads through the medium of the sprocket chains; but because of the arrangement shown and described, involving the provision of a clear space between the sprocket chains, and the arrangement of the load-sustaining rollers 10 in said space, the weight of the vehicle and the load carried thereby is imposed by said rollers directly upon the treads which rest upon the ground, and the wheels 13 are mounted on the axle 12 to merely support the upper portion of the belt and to engage the sprocket chains both above and below, thereby to prevent lateral displacement of the belt.

What I claim as my invention is:

1. In a traction device, an endless belt composed of sprocket chains and treads held together by said chains to travel on the ground, a frame, rotary elements on said frame to support and operate said belt, rotary members to support the frame on the lower portion of said belt, rotary means on said frame to prevent lateral displacement of said belt, said members engaging the treads centrally between the sprocket chains, so that said members roll on the unconnected portions of said treads, and said means confiningly engaging both sides of each of said sprocket chains at opposite sides of the path of travel of said members, whereby said engaging means are supported by the connected portions of the treads.

2. In a traction device, an endless belt to travel on the ground, a frame, rotary elements on said frame to support and operate said belt, rotary members to support the frame on the lower portion of said belt, and rotary means carried on said frame to prevent lateral displacement of the belt, said belt having links forming parallel endless chains, with transverse treads connecting the two chains, said members traveling on the belt between said chains, and said means traveling on and confiningly engaging each of said chains.

3. A traction device, as specified in claim 6, said frame having a transverse axis of tilting motion, said means being mounted on said axis, and means on said axis to drive the belt.

4. In a traction device, an endless belt arranged to travel on the ground, a tilting frame, rotary elements on said frame to support and operate said belt, means to transmit power to one of the rotary elements to drive said belt, rotary members to support the frame on the lower portion of said belt, rotary means carried on said frame and operated by the belt to prevent lateral displacement of said belt, and an axle forming the axis of said frame and rotary means, said rotary means supporting the upper portion of said belt in elevated position so that the top of the belt slopes downwardly toward the opposite ends of the frame, said frame having a transverse axis of tilting motion forming the axis of rotation of said rotary means and means on said axis to drive the belt.

5. In a tractor, the combination of a frame having a transverse axis of tilting motion, an endless belt comprising parallel chains connected by transverse treads, means on said frame to support and operate said chains, means on the frame to engage the belt between said chains, means on said axis to drive the belt, and means operated by the belt on said axis to engage said chains to prevent lateral displacement of the belt.

6. In a traction device, an endless belt to travel on the ground, a tilting frame, rotary elements on said frame to support and operate said belt, means to transmit power to one of said rotary elements to drive the belt, rotary members to support the frame on the lower portion of said belt, rotary means carried on said frame and operated by the belt to prevent lateral displacement of said belt, and an axle forming the axis of said frame and rotary means.

7. In a traction device, the combination of an endless traction belt, and means providing a transverse axis of tilting motion therefor, rotary means mounted on said axis means to prevent lateral displacement of the bottom portion of the belt, said rotary means being driven by the belt and rolling thereon, and power-transmitting-connections extending from said axis to operate said belt.

8. A structure as specified in claim 7, said rotary means comprising a wheel which rests on the lower portion of the belt and which supports the upper portion of the belt.

9. A structure as specified in claim 7, said rotary means comprising flanged wheels spaced apart, and said belt having parallel portions spaced apart to engage said wheels and rollers having flat treads which rest on the central portion of the belt and which roll thereon between said parallel portions thereof.

10. A structure as specified in claim 7, said power-transmitting connections including a rotary element on said axis, sprocket wheels for the belt, and means to connect said rotary element with said sprocket wheels.

11. In a traction device, the combination of an endless traction belt and means providing a transverse axis of tilting motion therefor, rotary means mounted on said axis to prevent lateral displacement of the bottom portion of the belt, said rotary means being driven by the belt and rolling thereon, and power-transmitting-connections to operate said belt, said rotary means comprising flanged wheels spaced apart, and said belt having parallel portions spaced apart to engage said wheels and rollers having flat treads which rest on the central portion of the belt and which roll thereon between said parallel portions thereof.

12. In a tractor, the combination of an axle, a frame having its middle portion mounted to oscillate on said axle, sprockets at the opposite ends of said frame, a caterpillar belt carried by said sprockets, rotary members on said frame to support the load weight of said axle on the lower portion of said belt, wheels on said axle to support the upper portion of said belt, a sprocket chain connection extending from said axle to the sprocket at one end of said frame, and means for operating said connection, thereby to drive the belt.

13. A structure as specified in claim 12, said rotary members comprising a pair of wheels mounted on said axle and spaced apart to support the upper portion of the belt and to travel on the lower portion of the belt, and said rotary members also comprising rollers carried by said frame and mounted to travel on the lower portion of the belt, said rollers being disposed in line with the space between the said wheels.

14. In traction construction, the combination of an endless series of transverse treads which travel on the ground, a plurality of sprocket chains connecting said treads together to form a broad traction belt, means resting on the treads between the chains to impose the load weight directly on the unconnected portions of said treads, and means confiningly engaging each of said chains to prevent lateral displacement of the belt.

15. A structure as specified in claim 14, in combination with means to provide a transverse axis about which the said caterpillar belt tilts freely while traveling over uneven surfaces.

16. A structure as specified in claim 14, in combination with a truck frame upon which both of said means are mounted, sprockets on said truck frame to support said sprocket chains, and means forming a transverse axis about which said truck frame tilts freely while the caterpillar belt is traveling over uneven ground surfaces.

17. A structure as specified in claim 14, in combination with a transverse axle, said sprocket-chain-engaging means being mounted on said axle.

Signed by me at Chicago, Cook county, Illinois, this 10th day of September, 1917.

JAMES C. FRENCH.